July 26, 1932.  H. E. SEE  1,868,770
TRACTOR ATTACHMENT
Filed April 27, 1931   2 Sheets-Sheet 1
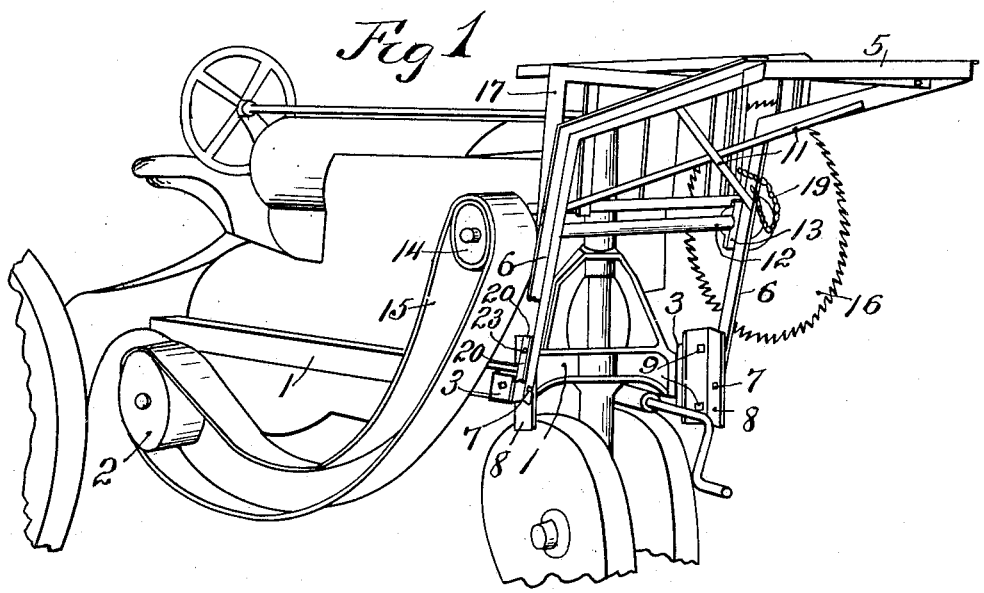
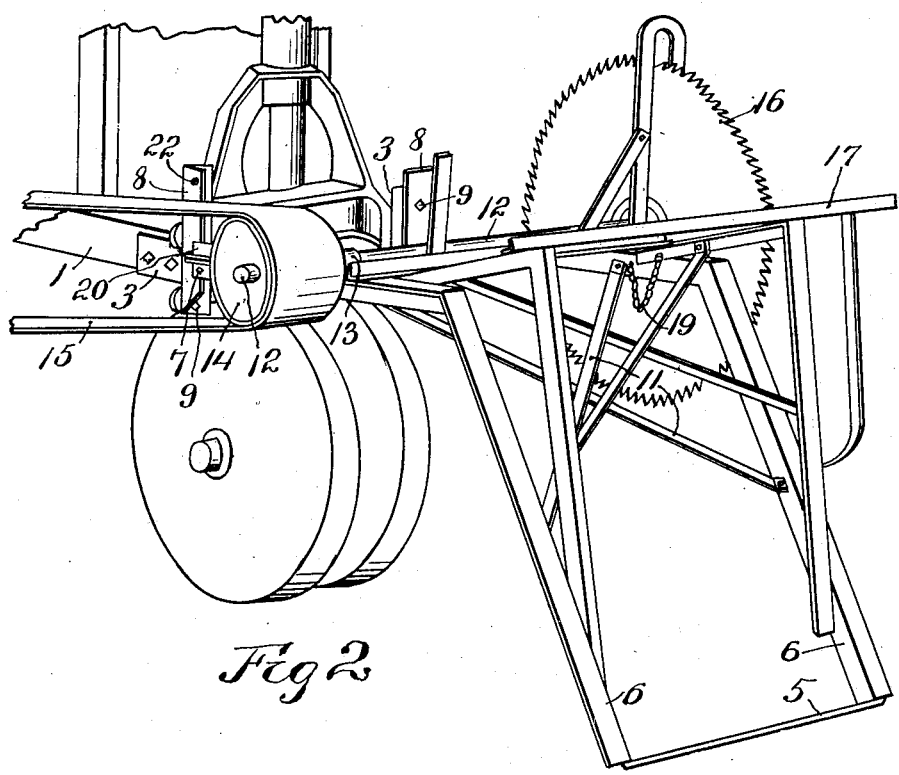
INVENTOR
Harvey E. See
BY Warren D. House,
His ATTORNEY
Witness
H. Vernon Olson July 26, 1932.   H. E. SEE   1,868,770
TRACTOR ATTACHMENT
Filed April 27, 1931   2 Sheets-Sheet 2
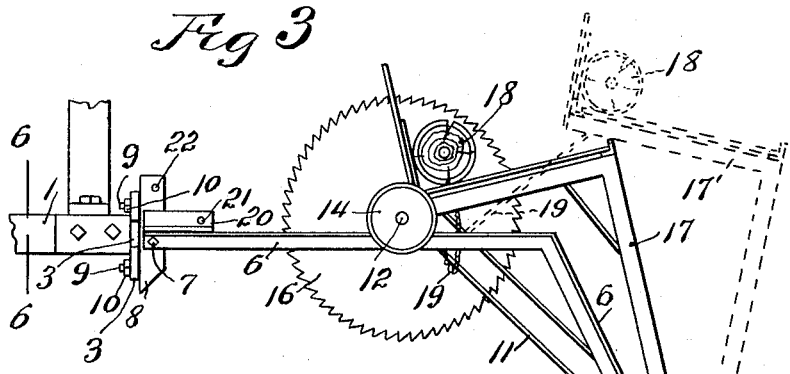
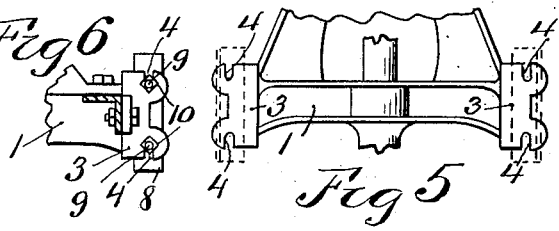
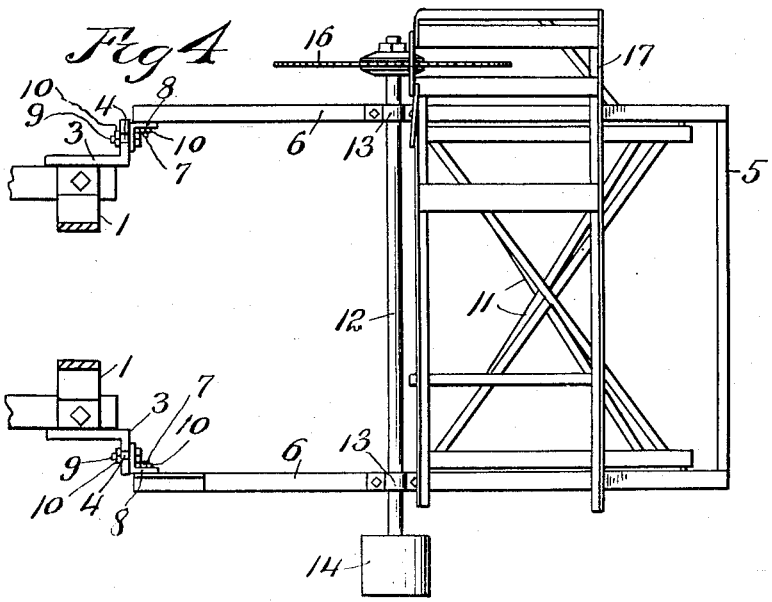

Patented July 26, 1932

1,868,770

UNITED STATES PATENT OFFICE

HARVEY E. SEE, OF BATES CITY, MISSOURI

TRACTOR ATTACHMENT

Application filed April 27, 1931. Serial No. 533,068.

My invention relates to improvements in tractor attachments.

One of the objects of my invention is to provide a novel attachment for a tractor, of a type in general use, which can be used for sawing, grinding, polishing, or similar purposes, and which has a rotary tool carrying member and means by which the tool carrying member may be driven from a rotary driving member on the tractor.

A further object of my invention is to provide an attachment of the kind described which has a support carrying the tool carrying member and work to be operated upon by a tool mounted on said member, the support being pivoted to the tractor frame so as to be swung from a lower operative position, to an upper position, in which it can be carried by the tractor clear of the ground, and out of the way, when it is desired to crank the tractor engine.

My invention provides further novel driving means including a belt for connecting the tool carrying member with a driving pulley of the tractor, the arrangement of said driving means relative to the support for the tool carrying member being such that, when the said support is swung to its lower operative position, the belt will be tightened, and when swung to its upper inoperative position, the belt will be automatically slackened so as to be in an inactive condition.

My invention provides further novel means for pivotally attaching the attachment to two front bearings, such as are provided at the front end of a tractor now in general use.

The novel features of my invention are hereinafter fully described and claimed.

In the accompanying drawings, which illustrate the preferred embodiment of my invention, Fig. 1 is a perspective view of my attachment shown mounted in the raised position on a tractor, parts of which are shown.

Fig. 2 is a view, similar to Fig. 1, the attachment being shown in the lower operative position, and only a front portion of the tractor being shown.

Fig. 3 is a side elevation of my attachment shown attached to a tractor, a part of the frame, only, of the tractor being shown, the attachment being shown in the lower operative position.

Fig. 4 is a top view of what is shown in Fig. 3.

Fig. 5 is an elevation of a portion of the front end of a tractor frame, showing the bearings of the frame to which my attachment is pivotally attached.

Fig. 6 is a section on the line 6—6 of Fig. 3.

Similar characters of reference designate similar parts in the different views.

1 designates the frame of a tractor of a type in general use. 2 designates a rotary driving pulley, at the right side of the tractor, with which the tractor is equipped.

The front of the tractor frame 1 is provided at opposite sides respectively with two brackets 3, Fig. 5, which serve as bearings to which my attachment is adapted to be pivoted. Said brackets or bearings 3 are provided each with a slot 4 in the upper end and lower end.

My improved attachment provides a support consisting of a U shaped member, the transverse horizontal portion 5 of which is adapted to rest on the ground, when the support is in the lower operative position, shown in Figs. 2, 3 and 4. The arms 6 of said U shaped member extend upwardly and then rearwardly, the rear ends of the arms 6 being respectively pivoted by horizontal transverse bolts 7 to two vertical flanges of angle bars 8, the other flanges of which are respectively fastened to the front sides of the brackets or bearings 3.

To fasten the angle bars 8 to the bearings or brackets 3, bolts 9 are extended through said other flanges of the angle bars and through the slots 4 in the bearings or brackets 3, Figs. 3, 4 and 6. Securing nuts 10 are mounted on the bolts 7 and 9.

The bolts 7 are parallel with the axis of the driving pulley 2.

Diagonal crossed braces 11 connect the arms 6 of the U shaped support.

A tool carrying member comprising a horizontal shaft 12, which is parallel with the axis of the U shaped support and with the axis of the driving pulley 2, is rotatable in bearings 13 respectively mounted on the arms 6 of the U shaped support, Fig. 4.

Fastened on the shaft 12 is a pulley 14 which is connected with the driving pulley 2 by a belt 15.

Fastened on the shaft 12 is a circular saw 16. Pivoted to the arms 6 of the main support is a work support comprising a frame 17 adapted to carry the work to be operated on, as a log 18, Fig. 3. The work supporting frame 17 is adapted to be swung toward the shaft 12 to an operative position, shown in solid lines in Fig. 3, and in moving to such position bringing the log 18 against the saw 16. The frame 17 is adapted to be swung from said shaft 12 to the dotted position shown in Fig. 3, in which position it is held from further forward movement by a chain 19 attached to one of the arms 6 and to the frame 17.

When the support 6 is swung to the operative position shown in Fig. 2 the part 5 is adapted to rest on the ground, and the shaft 12, pivot bolts 7 and the axis of the driving pulley 2 are in substantial alinement, thus tensioning the belt 15.

When the main support is swung upwardly to the transporting position shown in Fig. 1, the belt 15 will be slackened, as shown.

To releasably hold the supporting frame in said raised position, there is fastened to one of the arms 6 thereof an angle piece 20 provided with a hole 21, Fig. 3, adapted to register with a hole 22 in the adjacent angle bar 8. A bolt 23, Fig. 1, is adapted for removable insertion through the holes 21 and 22 so as to hold the supporting frame 6 in the elevated position shown in Fig. 1.

To remove the attachment from the tractor, it is but required to remove one of the bolts 9 from each of the slots 4 in the bearings or brackets 3, after which the other two bolts 9 may be slipped vertically out of the other two slots 4 in said bearings or brackets 3. To fasten the attachment to the tractor, this operation is reversed.

I do not limit my invention to the specific structure described, as modifications of my invention, within the scope of the appended claims, may be made without departing from the spirit of my invention.

What I claim is:—

1. In a tractor attachment, the combination with the frame of a tractor having at its front and at opposite sides thereof two brackets provided each with two slots one extending upwardly from the lower end of the bracket, and the other extending downwardly from the upper end of the bracket, of two bars respectively bearing against said brackets, bolts respectively extending through said slots and engaging said bars for fastening the latter to said brackets, a support pivoted on a horizontal axis to said bars and adapted to swing from a lower operative position to a raised position, means adapted to releasably fasten said support to one of said bars when said support is in the raised position, revoluble tool supporting means carried by said support, and means adapted to be connected with and driven by a rotary member of the tractor for revolving said tool supporting means.

2. In a tractor attachment, the combination with the frame of a tractor having at its front end and at opposite sides thereof respectively two brackets each having two slots in its upper and lower edges respectively, of a support, revoluble tool carrying means on said support, four bolts respectively in said slots, means fastened by said bolts to said brackets for pivotally supporting said support on a horizontal axis, and which permits said support to swing to and from a lower operative position and to an upper position, and means for releasably holding said support in said upper position.

In testimony whereof I affix my signature.

HARVEY E. SEE.